Figure 1:
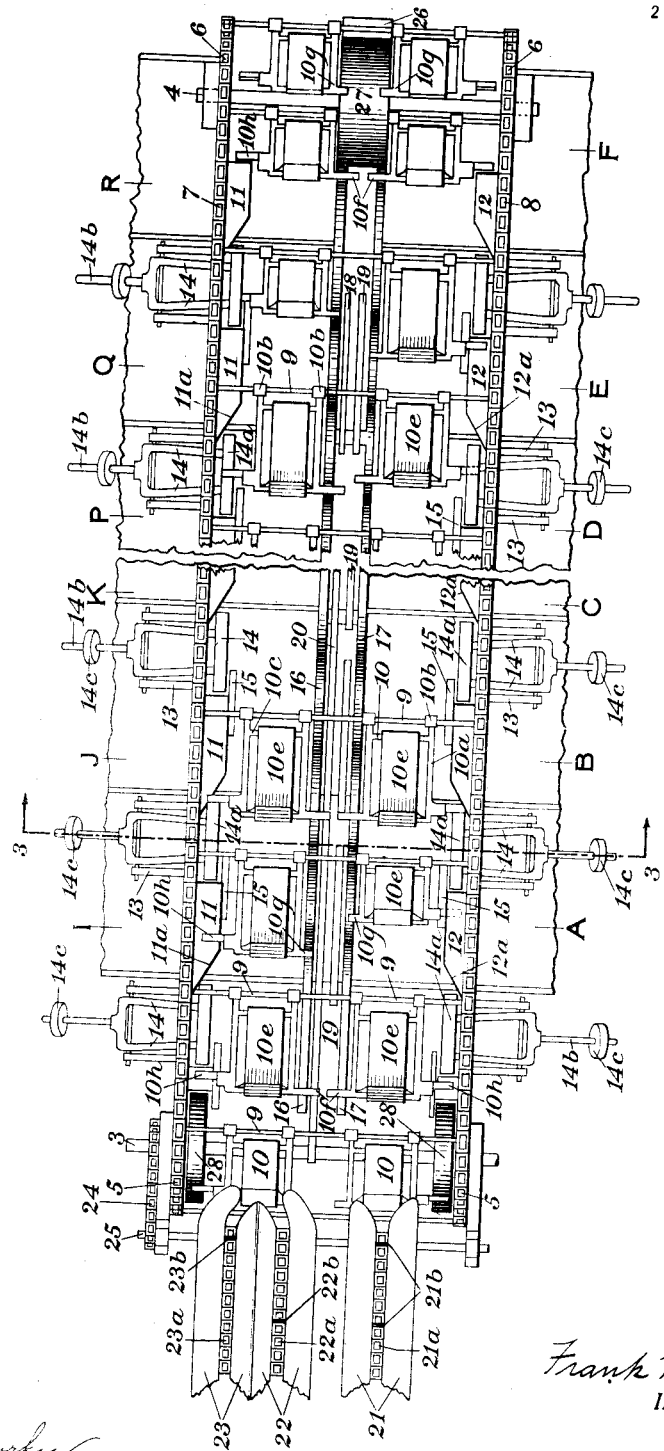

F. W. CUTLER.
FRUIT GRADING MACHINE.
APPLICATION FILED JUNE 12, 1915.
1,184,697.
Patented May 23, 1916.
2 SHEETS—SHEET 2.
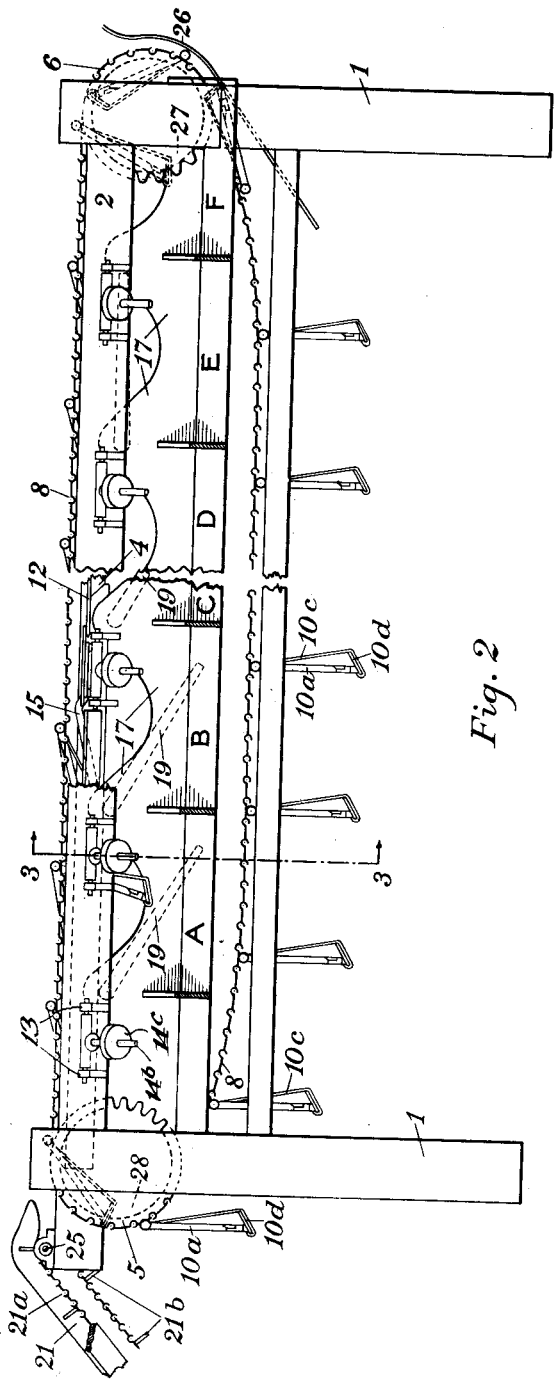
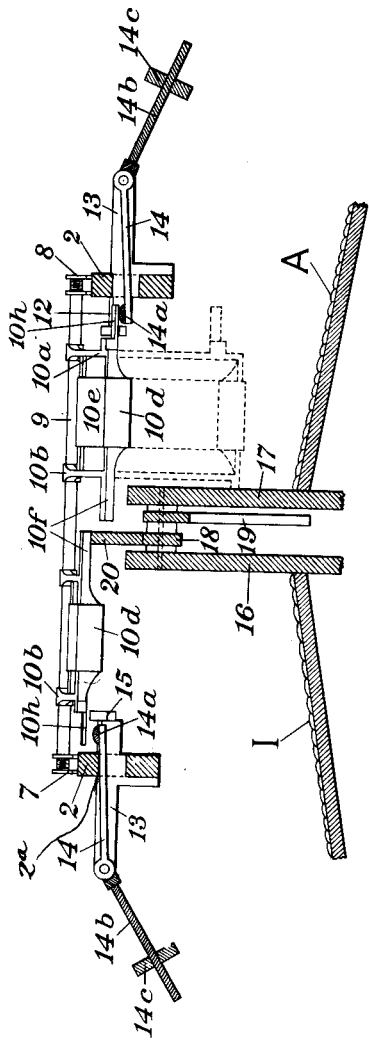
WITNESSES:
Frank W. Cutler
INVENTOR.
BY
ATTORNEYS.

UNITED STATES PATENT OFFICE.

FRANK W. CUTLER, OF HOOD RIVER COUNTY, OREGON, ASSIGNOR TO CUTLER FRUIT GRADER CO., A CORPORATION OF OREGON.

FRUIT-GRADING MACHINE.

1,184,697.  Specification of Letters Patent.  Patented May 23, 1916.

Application filed June 12, 1915. Serial No. 33,651.

*To all whom it may concern:*

Be it known that I, FRANK W. CUTLER, a citizen of the United States, residing in the county of Hood River and State of Oregon, have invented certain new and useful Improvements in Fruit-Grading Machines, of which the following is a specification.

My invention relates to fruit grading machines of the character shown and described in my pending application, filed March 25, 1915, Serial Number 16,897, the object of this application being to cover certain improvements which have been developed in connection with the experimental work on the invention as set forth in said pending application. Among the improvements developed and set forth in this application are, — to provide in combination with one or more traveling conveyers and the receiving bins for the fruit which is to be assorted, an improved scale mechanism for each receiving bin capable of various adjustments and, therefore, adaptable to the variations in weight of the fruit being assorted; to provide in combination with the carrying members, means for controlling their movements to their dumping positions, by holding them so that they will move gradually into dumping positions rather than to drop thereinto, in the manner set forth in my pending application; to provide in a fruit grading machine of the character referred to, means for converting the same from a machine adapted to handle one or two grades of fruit to a machine capable of handling three or four grades of fruit; to provide in a machine of the character referred to, means for automatically distributing fruit of the same size, in the same grade, into two or more receiving bins. and, in general, to provide in an improved fruit grading machine, means for rapidly, accurately and economically grading and distributing the fruit into suitable bins, provided to receive the same.

In order that others may understand my invention, I have illustrated one practical embodiment thereof in the accompanying sheet of drawings which I will now describe.

Figure 1 is a top plan view of a machine embodying my invention with a section of the same broken out to reduce the size of the figure; Fig. 2 is a side elevation of the same; and Fig. 3 is a vertical cross-sectional view taken substantially on the line 3—3 of Fig. 2.

Referring now more in detail to the drawings, the machine comprises a supporting frame composed of the leg members 1—1, and the side members 2—2. Mounted in the opposite ends of said frame are two shafts 3 and 4, upon which are mounted suitable sprockets 5—5 and 6—6, carrying sprocket chains 7 and 8, extending the full length of the machine, as indicated. Extending across from one chain to the other is a series of cross-rods 9—9, upon which are mounted two series of article carriers 10—10. Said carriers comprising rectangular frame members $10^a$, pivotally secured to the rods 9, as at $10^b$, each of said frame members having cross pieces $10^c$. toward its forward end, and a cross plate $10^d$, at its rear end, as clearly shown in Figs. 2 and 3. Each carrier member is provided with a canvas bottom $10^e$, secured to the cross piece $10^c$, and extended around the cross plate $10^d$, and secured thereto, so as to form a bottom to the carrier member. The carrier members are also provided at their adjacent or inner sides with supporting prongs, or fingers, of different lengths extending laterally therefrom, the longer fingers being designated $10^f$, and the shorter fingers being designated $10^g$. Said carrier members are also provided at their outer sides with guide prongs, or fingers, $10^h$—$10^h$, adapted to ride upon different supports, and upon the scale mechanism hereinafter described. Mounted along the opposite sides of the machine, adjacent the conveyer chains 7 and 8, are two series of deflecting plates 11—11 and 12—12, each having a beveled and sharpened end, as at $11^a$ and $12^a$.

Mounted along the opposite sides of the machine, upon the side members 2—2, are supporting brackets 13—13, between which are pivotally mounted scale members 14—14, having scale bars $14^a$—$14^a$, extending across their inner ends, having rounded upper bearing edges and having downwardly inclined screw arms $14^b$—$14^b$ at their outer ends upon which are adjustably mounted weight disks $14^c$—$14^c$. Scale members 14, project through apertures $2^a$ in the side members 2—2, and the rounded scale bars 14ª, are supported upon the ends thereof, normally slightly above horizontal alinement with the supporting plates 11 and 12, whereby as the projecting prongs or fingers 10ʰ from the carrier members move upon said scale bars 14ª, if the weight in the carrier is sufficient to over-balance the adjustable weight disk 14ᶜ, said scale bar 14ª, will be depressed and permit the prong or finger to pass underneath the beveled end of the plate 11 or 12, as the case may be.

Mounted upon the inner sides of the side members 2—2, and inwardly of the bearing plates 11 and 12, and extending across the space between said plates 11 or 12, and the scale bars 14ª, are inclined approach, or guiding bars 15—15, adapted to carry the prongs or fingers projecting from the side of the carrier members upwardly from the supporting plates 11 or 12, and to direct them gradually downwardly on to the scale bars 14ª, thus preventing the carrier member from being dropped at all upon the scale bars.

Mounted longitudinally through the frame of the machine, at a space apart, are two wall members 16 and 17, constituting supporting members having undulating or wave-like upper edges, as clearly indicated in Fig. 2, for a purpose hereinafter described. Mounted between said wall members, and spaced therefrom and from each other, are pivoted arms 18 and 19, shown in dotted lines in Fig. 2, and also clearly shown in Figs. 1 and 3. These are adapted to be raised so as to bridge or form a support from one crest of the wall 16 or 17, to the next crest thereof, whereby to prevent the long fingers 10ᶠ—10ᶠ, moving down into the trough of the wall member 16 or 17, for a purpose hereinafter referred to.

In order to convert the machine so that it will take care of three grades of fruit, a supporting or bearing strip 20 may be laid upon the tops of the arms 18—18, for a portion of the entire length of the machine, as the case may be, this bar being indicated in Fig. 1, as extending from the front of the machine to the break in the drawing, beyond which is shown in top plan view, the arms 18 and 19.

Suitable receiving bins are arranged in the machine, the bins on one side being designated A, B, C, D, E and F, and the bins on the other side being designated I, J, and K, and P, Q and R.

At the receiving end of the machine are feed conveyer members 21, 22 and 23, having traveling conveyer chains 21ª, 22ª and 23ª therein, provided with carrier lugs as 21ᵇ, 22ᵇ and 23ᵇ, adapted to carry the fruit deposited therein and discharge it into the carrier members 10, mounted upon the cross bars 9, hereinbefore referred to.

The receiving bins A, B, C, D, E and F, are adapted to receive the first grade of fruit which is fed to the feed conveyer 21, the bins I, J, and K, receiving the second grade, when the strip or bar 20 is in place, while the pins P, Q and R, located beyond the end of the strip or bar 20, receive the third grade fruit. When the bar 20 is removed, the second grade, is distributed according to weight throughout the full line of bins from I to R.

It will be understood, of course, that a corresponding strip, or bar, 20, can be placed over the arms 19, so as to adapt the first series of receiving bins to receive two grades of fruit, in which case it would be necessary to provide another feed conveyer.

The second grade of fruit is fed to alternate carriers through the said conveyer 22, these carriers having the short supporting prongs 10ᵉ, while the third grade is fed by the feed conveyer 23, into the other alternate carrier members, which have the long prongs or fingers 10ᶠ. The conveyer chain 23ª of the feed conveyer 23, which feeds the third grade of fruit to the machine, has only half as many conveyer lugs 23ᵇ, as has the conveyer chain 22ª, and these are arranged in staggered relationship to the lugs 22ᵇ, on the conveyer 22, and said conveyers are so timed, being driven from the same shaft, that the third grade fruit is fed to the alternate carrier members 10, which have the long fingers 10ᶠ, projecting laterally therefrom and adapted to ride upon the strip or bar 20, to its end, after which said carriers are supported by the fingers or prongs 10ʰ—10ʰ, at their outer sides upon the deflecting plates 11 or 12, the approach bars 15, and the scale bars 14ª, as the case may be. The main carrier chains of the machine are driven from the shaft 4. The shaft 3, at the opposite end, is provided with a sprocket and sprocket chain, as at 24, connecting it to the shaft 25, which drives the feed conveyer chains 21ª, 22ª and 23ª. The machine can be driven by any suitable power, as may be desired. At the right hand end of the machine, as indicated in Fig. 2, are guide members, as 26, adapted to support and direct the carrier members by their fingers, as they pass around the sprocket 6, at that end of the machine, so as to allow them to swing down gradually into a hanging position from the lower lap of the conveyer chains 7 and 8, as clearly indicated in said Fig. 2. At the discharge end of the machine there is mounted upon the shaft 4, between the two lines of carriers, a drum 27, adapted to support the carriers by their fingers and to cause them to be raised and turned over as they pass around the drum, as will be clearly understood from Fig. 2. At the forward, or feed, end of the machine, there is mounted upon the shaft 3, adjacent the sprockets 5—5, two disks 28—28, which serve to carry the swinging carriers up into receiving positions, as will be clearly understood from Fig. 2.

The operation of the machine may be briefly described as follows: Assuming that the strip, or bar, 20, is in position so that the machine will take care of three grades of fruit, and that the feed conveyers 21, 22 and 23 are being supplied, each with a different grade of fruit, each grade consisting of pieces of fruit of various weights; the fruit from feed conveyer 21 is fed, one piece at a time, into the carrier members 10, traveling along the right hand side of the machine, being the lower side of Fig. 1. Pieces of fruit which are heavy enough to depress the scale bar 14$^a$, of the scale mechanism when the prong or guide finger 10$^h$, of the carrier moves thereupon, sufficiently to cause said guide finger to pass beneath the corresponding beveled plate 12, will cause the supporting prong, or finger 10$^f$, of the said carrier to drop upon the crest of the partition or wall member 17, allowing the carrier to move gradually downwardly into dumping position to discharge the fruit into bin A. If the fruit is not sufficiently heavy to depress the first scale bar, the carrier finger 10$^h$ moves on to the plate 12, and then upwardly on the approach bar 15, and downwardly on to the next scale bar 14$^a$, by a gradual movement. If the fruit is sufficiently heavy to depress this scale bar, whose weight disk 14$^c$ is adjusted slightly inwardly, compared with the weight of the first scale member, the fruit will be discharged into bin B in the manner just described. Thus fruits of different weights will be carried to the different scale bars and will depress the same, depending upon the adjustment of their weight disks 14$^c$. Fruit of a second grade, which is being fed from the feed conveyer 22, will be discharged, piece by piece, into alternate carriers 10, which have the short prongs or fingers 10$^g$, and is discharged into the bins I, J and K in the same manner as described in connection with fruit of grade one, the fingers or prongs 10$^h$ moving upon the plate members 11, approach bars 15 and scale bars 14$^c$, in the same manner as before described. Fruit of the third grade, fed by the feed conveyer 23, is discharged, piece by piece, into the other alternate carrier members, whose inner or long fingers 10$^f$, extend to and ride upon the strip or bar 20, throughout its length, after which their guide fingers, or prongs 10$^h$, at the opposite sides of the carriers, ride upon the plates 11, approach bars 15, and scale bars 14$^c$, which are located beyond the end of the strip or bar 20, and are discharged into the bins P, Q and R, according to their weight in the manner before described. Thus it will be seen that by simply adjusting the scale weights 14$^c$, so that the scale mechanisms from the first to the last bins of each series, will have progressively less supporting power, pieces of fruit of different weights can be carefully discharged into corresponding bins, and that by placing the bar 20 in position to support the carriers having long fingers, one line of bins can be divided so as to receive two grades of fruit. If now it is desired to put pieces of fruit of the same weight into two adjacent bins, it is only necessary to lift one of the pivoted arms, 19 for example, so as to bridge the space between two adjacent crests of the wall 17, so that said arm 19 will support and carry the long prongs, or fingers, 10$^f$, of the carriers across the trough to the next adjacent crest of the wall 17, whereupon said long carrier fingers or prongs will move down into the next adjacent trough so that its carrier will empty the fruit into the next bin, whereas the carriers which have the short prongs or fingers, 10$^g$, are free to move upon the wall 17, and discharge its fruit into the first bin, assuming, of course, that the fruit is of the proper weight to depress the scale bar corresponding to that bin. Fruit which is too light to actuate any of the scale bars will be carried by the carriers and discharged at the end of the machine as they turn around the end sprockets 6—6.

I am aware that changes can be made in the mechanisms here shown and described for the purpose of illustrating my invention, without departing from the spirit thereof, and I do not, therefore, limit my invention to the particular constructions here shown, except as I may be limited by the hereto appended claims.

I claim:

1. In a fruit grading machine, in combination, a traveling conveyer, a series of fruit carriers movably connected thereto and adapted to support and carry pieces of fruit, a series of receiving bins, and a scale mechanism for each receiving bin, adapted to yieldingly support and determine the course of said carriers as they move across the same.

2. In a fruit grading machine, in combination, a traveling conveyer, a series of fruit carriers pivotally connected thereto and adapted to support and carry pieces of fruit, a series of receiving bins, and a scale mechanism for each receiving bin adapted to yieldingly support and determine the course of said carriers as they move across the same.

3. In a fruit grading machine, in combination, a traveling conveyer, a series of fruit carriers movably connected thereto and adapted to support and carry pieces of fruit, said carriers being provided with laterally projecting supporting fingers, a series of receiving bins, and a scale mechanism for each receiving bin adapted to support and direct said carriers by means of said fingers, as they move across the same.

4. In a fruit grading machine, in combination, a traveling conveyer, a series of fruit carriers pivotally connected thereto and adapted to support and carry pieces of fruit, said carriers being provided with laterally projecting supporting fingers, a series of receiving bins, and a scale mechanism for each receiving bin adapted to support and direct said carriers by means of said fingers, as they move across the same.

5. In a fruit grading machine, in combination, a traveling conveyer, a series of fruit carriers movably attached thereto and moving therewith, a series of receiving bins, a stationary scale mechanism for each bin positioned to yieldingly support and direct each carrier moving thereupon according to the weight of the article carried therein, and means for regulating said scale mechanism whereby to adapt it to be operated by pieces of fruit of predetermined weight.

6. In a grading machine, a traveling conveyer with article carriers movably attached thereto and moving therewith, a series of receiving bins, and a series of scale mechanisms, each scale mechanism comprising a yielding supporting structure in the path of travel of said conveyer and adapted to yieldingly support said carriers as they move thereupon, and to determine their dumping action.

7. In a grading machine, a traveling conveyer with article carriers movably attached thereto and moving therewith, a series of receiving bins, and a series of scale mechanisms, each comprising a pivoted supporting structure projecting at one end into the path of travel of said conveyer and adapted to yieldingly support said carriers as they move thereupon, and provided at its opposite end with an adjustable counterweight.

8. In a grading machine, in combination, a traveling conveyer, a series of article supporting carriers attached thereto and moving therewith, a series of receiving bins, means apart therefrom for controlling the movements of said article carriers relative to said conveyer for dumping articles carried, a series of scale mechanisms interposed in the path of said conveyer and upon which said carriers move, and means for regulating said scale mechanisms, whereby to predetermine the dumping movements of said carriers.

9. In a grading machine, in combination, a traveling conveyer, a series of article carriers pivotally connected thereto and moving therewith, a series of receiving bins, a series of scale mechanisms adjacent said conveyer and said receiving bins, projecting supporting portions from said carriers adapted to move upon said scale mechanisms and to actuate the same under the weight of the article carried, and means coöperating to control the dumping movement of said article carriers.

10. In a fruit grading machine, in combination with a conveyer and article carriers movably attached thereto and a series of receiving bins, of means for holding said article carriers to a gradual dumping movement, and means for controlling the dumping action thereof.

11. In a grading machine, a series of receiving bins, a traveling conveyer, a series of article carriers attached thereto and movable relative thereto to dumping positions, means controlling the dumping location of said carriers, and means controlling the dumping movement thereof, whereby to cause them to move into dumping position gradually.

12. In a fruit grading machine, in combination, a traveling conveyer, a series of article carriers movably attached thereto and moving therewith, a series of receiving bins, a wave-like supporting member along said receiving bins, and means for supporting said article carriers upon said wave-like supporting member as they are moved along by said conveyer, whereby to control the movement of said article carriers relative to said conveyer.

13. In a grading machine, in combination, a traveling conveyer, a series of article carriers attached thereto and movable relative thereto into dumping positions as they are moved along therewith, a series of receiving bins, an undulating supporting member adjacent said conveyer, and a scale mechanism interposed in the path of travel of said conveyer, and upon which said article carriers are intermittently supported during their course of travel, said scale mechanism being adapted to control the course of travel of said carriers.

14. In a fruit grading machine of the character referred to, in combination with a traveling conveyer provided with a series of article carriers, a series of receiving bins, an undulating or wave-like supporting member adapted to support said article carriers as they are moved along with said conveyer, and a bridging arm or member adapted to be put into position to connect two adjacent upper or crest portions of said undulating member.

15. In a grading machine, in combination, a traveling conveyer provided with a series of article carriers moving therewith and movable relative thereto into dumping positions, a series of receiving bins, a scale mechanism interposed in the path of travel of said conveyer and over which said article carriers are moved, guide members for supporting said article carriers to said several receiving bins, said scale mechanism being adapted to direct said article carriers to said guide members, and means controlling the movement of the article carriers relative to the conveyer into dumping positions.

16. In a fruit grading machine, in combination with a traveling conveyer provided with a series of carrier members adapted to support and carry pieces of fruit, and movable relative to said conveyer from carrying to dumping positions, means for causing a gradual movement of each carrier to its dumping position.

17. In a grading machine, in combination, a traveling conveyer provided with a series of article carriers moving therewith, and two feeding mechanisms, each adapted to feed into alternate carriers on said conveyer.

18. In a grading machine, in combination, a traveling conveyer provided with a series of article carriers moving therewith and also movable relative thereto into dumping positions, two series of receiving bins, two feeding mechanisms adapted for feeding articles alternately to said article carriers, and means controlling the dumping movements of said article carriers, whereby alternate article carriers are dumped in one series of receiving bins, and the other alternate article carriers are dumped into the other series of receiving bins.

19. In a grading machine, in combination, a series of receiving bins, a traveling conveyer, a series of article carriers attached thereto and moving therewith, said article carriers being movable relative thereto into dumping positions, a supporting member extending along adjacent a portion of said receiving bins, means for supporting a portion of said article carriers upon said supporting member as they are moved therealong, and means associated with each receiving bin for selecting and dumping said article carriers as they are moved therealong.

20. In a grading machine, in combination with an endless traveling conveyer, article carriers, each comprising a frame member pivotally connected at one end to said conveyer, and provided at its opposite end with a supporting prong or finger, and a flexible supporting member attached to the opposite ends of said frame member for supporting articles placed therein.

21. In a grading machine, in combination with an endless traveling conveyer, article carriers, each comprising a frame member pivotally connected at one end to said conveyer, and provided at its opposite end with a supporting prong or finger, and a flexible supporting member attached to the opposite ends of said frame member for supporting articles placed therein, and guide members arranged along adjacent the path of travel of said article carriers for supporting the same by said fingers or prongs.

22. In an assorting machine, in combination with a traveling conveyer provided with a series of article carriers attached thereto and movable relative thereto, a scale mechanism separate and apart from said conveyer and comprising a pivoted structure provided at one end with a supporting or bearing member, and at its other end with an angularly disposed arm, and a weight member adjustably mounted thereupon and adapted to be held in adjusted positions, for the purpose described.

23. In a fruit grading machine, in combination, a supporting structure, two endless conveyer members mounted at a space apart to travel thereupon, connecting rod members between said conveyer, article carriers pivotally connected to said connecting rods at one end with their opposite ends movable transversely of said conveyers, said article carriers being provided at their free ends with laterally projecting supporting fingers, or portions, and guide members along the path of travel of said article carriers and adapted to support the free ends thereof by their supporting fingers, a series of receiving bins over which said article carriers travel, and means for automatically releasing the free ends of said article carriers at predetermined locations, whereby to permit them to move down into dumping positions, substantially as described.

24. In a fruit grading machine, in combination, a supporting body, a traveling conveyer mounted to travel thereon, a series of article carriers attached to said conveyer and movable transversely thereof, a series of yielding supports along the course of travel of said conveyer, separate and apart therefrom, means for regulating the same, means upon said article carriers for supporting the same upon said yielding supports as said carriers are moved therealong, a series of receiving bins, and means coöperating with said yielding supports and said article carriers for causing the latter to be emptied into said bins, substantially as described.

Signed at Portland, Oregon, this 29 day of May, 1915.

FRANK W. CUTLER.

Witnesses:
I. M. GRIFFIN,
A. S. TREW.